US010337582B2

(12) United States Patent
Ono

(10) Patent No.: US 10,337,582 B2
(45) Date of Patent: Jul. 2, 2019

(54) DAMPER AND METHOD FOR MANUFACTURING DAMPER

(71) Applicant: NIFCO INC., Yokosuka-shi, Kanagawa (JP)

(72) Inventor: Takashi Ono, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/550,235

(22) PCT Filed: Feb. 19, 2016

(86) PCT No.: PCT/JP2016/054857
§ 371 (c)(1),
(2) Date: Aug. 10, 2017

(87) PCT Pub. No.: WO2016/133198
PCT Pub. Date: Aug. 25, 2016

(65) Prior Publication Data
US 2018/0023653 A1    Jan. 25, 2018

(30) Foreign Application Priority Data

Feb. 20, 2015    (JP) .................. 2015-031605

(51) Int. Cl.
*F16D 57/00* (2006.01)
*F16F 9/12* (2006.01)
(Continued)

(52) U.S. Cl.
CPC ............... *F16F 9/12* (2013.01); *B29C 45/16* (2013.01); *B29C 45/4407* (2013.01);
(Continued)

(58) Field of Classification Search
CPC .......... F16F 9/12; F16F 9/145; F16F 2232/02; B29C 45/44; B29C 45/4407; B29C 2045/4492
See application file for complete search history.

(56) References Cited

U.S. PATENT DOCUMENTS 4,030,850 A * 6/1977 Hyde ................... B65D 90/08
403/288
4,869,125 A * 9/1989 Saigusa .................. F16D 57/00
464/180
(Continued)

FOREIGN PATENT DOCUMENTS

EP    1565670 A1    8/2005
EP    1686283 A1    8/2006
(Continued)

OTHER PUBLICATIONS

PCT/ISA/210, "International Search Report for International Application No. PCT/JP2016/054857," dated Mar. 22, 2016.
Europe Patent Office, "Search Report for European Patent Application No. 16752584.9," dated Sep. 28, 2018.

*Primary Examiner* — Nicholas J Lane
(74) *Attorney, Agent, or Firm* — Manabu Kanesaka

(57) ABSTRACT

A damper is formed by a housing member wherein an outer cylinder portion and an inner cylinder portion that are cylindrically formed are concentrically disposed, and respective lower ends are connected to each other at a bottom portion, and at an upper end of the outer cylinder portion, an open end portion is formed, and a groove portion is formed on an inner periphery; and a lid member provided with a rotor inserted from the open end portion, and housed in the housing member, and formed with a projection portion engaging the groove portion. A thin wall portion which is thinner than the outer cylinder portion is formed in a vicinity of a groove portion side in the outer cylinder portion.

9 Claims, 6 Drawing Sheets

(51) Int. Cl.
  *F16F 9/14* (2006.01)
  *B29C 45/44* (2006.01)
  *B60N 3/02* (2006.01)
  *F16F 9/54* (2006.01)
  *F16B 21/06* (2006.01)
  *F16J 15/18* (2006.01)
  *B29C 45/16* (2006.01)
  *B29D 24/00* (2006.01)
  *F16F 9/32* (2006.01)

(52) U.S. Cl.
  CPC ............ *B29D 24/001* (2013.01); *B60N 3/02* (2013.01); *B60N 3/023* (2013.01); *F16B 21/06* (2013.01); *F16F 9/145* (2013.01); *F16F 9/3271* (2013.01); *F16F 9/54* (2013.01); *F16J 15/18* (2013.01); *F16F 2226/04* (2013.01); *F16F 2232/02* (2013.01); *F16F 2234/02* (2013.01)

(56) References Cited

U.S. PATENT DOCUMENTS

| | | | |
|---|---|---|---|
| 6,662,683 | B1 | 12/2003 | Takahashi et al. |
| 7,753,181 | B2 * | 7/2010 | Doornbos ................. F16F 9/12 |
| | | | 188/290 |
| 2006/0045614 | A1 | 3/2006 | Johansson et al. |
| 2006/0169555 | A1 | 8/2006 | Doornbos |
| 2012/0073919 | A1 * | 3/2012 | Berry, Jr. ................. E05F 5/00 |
| | | | 188/296 |
| 2013/0306417 | A1 * | 11/2013 | Ono ......................... F16J 15/18 |
| | | | 188/290 |
| 2015/0102620 | A1 * | 4/2015 | Ichioka ..................... F16F 9/12 |
| | | | 296/1.02 |
| 2017/0248162 | A1 * | 8/2017 | Gruhler .................. B29C 45/44 |

FOREIGN PATENT DOCUMENTS

| | | |
|---|---|---|
| JP | 2003-506256 A | 2/2003 |
| JP | 2012-145156 A | 8/2012 |
| JP | 5210578 B2 | 6/2013 |

* cited by examiner

DAMPER AND METHOD FOR MANUFACTURING DAMPER

FIELD OF TECHNOLOGY

The present invention relates to a damper used for the purpose of buffering or braking, and a method for manufacturing the damper.

BACKGROUND ART

Conventionally, for example, a damper is provided in an assist grip and the like which is an interior of an automobile, and brakes a movement when the assist grip returns to an original position by a restoring force of a spring and the like. As for such a damper, for example, there are a damper device described in Patent document 1 described hereinafter, and a method for manufacturing a resin molded member including an undercut portion described in Patent Document 2 described hereinafter.

In the damper device described in Patent Document 1, a cylindrical inner part which is a rotor, and a cylindrical outer part which is a housing are concentrically integrated. Each part is integrated by fitting an annular projection formed on an outer periphery of the inner part into an annular groove formed on an inner periphery of the outer part. The projection and the groove in molding are generally so-called undercuts, respectively.

On the other hand, in the method for manufacturing the resin molded member including the undercut portion described in Patent Document 2, a resin molded member is made by an inner slide forming die and an outer slide forming die. In the inner slide forming die, there is formed an annular projection for forming an annular groove on an inner periphery of the resin molded member, wherein a taper enlarging in diameter in a direction of being removed from the resin molded member is made. When the inner slide forming die is removed from the resin molded member, the projection can easily slip out of the groove of the resin molded member by the taper.

PRIOR ART DOCUMENT

Patent Document

Patent Document 1: Japanese Unexamined Patent Application Publication No. 2012-145156
Patent Document 2: Japanese Patent No. 5210578

SUMMARY OF THE INVENTION

Problems to be Solved by the Invention

In the aforementioned undercut, in the molding, there is a case wherein a molded article happens to be deformed when it is demolded from a forming die. Namely, in the damper device described in Patent Document 1, when demolded from a core pin in the molding of the outer part, there is a case wherein an edge of the outer part turns up in a mold releasing direction from an inside, i.e., curling occurs by a projection of the core pin for molding the groove on the inner periphery of the outer part. This is notable in a case wherein the outer part is demolded from the core pin before it is completely hardened in order to shorten a molding time. In that case, the curling destabilizes a fitting state between the outer part and the inner part, and thereby a torque becomes unstable, and a damper performance declines.

On the other hand, according to the method for manufacturing the resin molded member including the undercut portion described in Patent Document 2, in the inner slide forming die, there is formed the taper enlarging in diameter in the direction of being removed from the resin molded member, so that although it is difficult to cause the curling, the molded article becomes a tapered shape by the taper as well so as to limit a design.

The present invention is made in consideration of the aforementioned actual situation. Namely, an object of the present invention is to provide a damper which can stabilize the torque without receiving a limit of the design as little as possible, and a method for manufacturing the damper.

Means for Solving the Problems

In order to obtain the aforementioned object, a damper according to the present invention comprises a housing member wherein a bottom portion is formed at one end of an outer cylinder portion formed in a cylinder shape, an open end portion is formed at the other end of the outer cylinder portion, and a groove portion is formed on an inner periphery; and a lid member wherein a movable member housed in the housing member is provided, and a projection portion engaging the groove portion is formed, wherein a thin wall portion which is thinner than the outer cylinder portion is formed between the groove portion and the bottom portion in the outer cylinder portion.

In the damper according to the present invention, preferably, the thin wall portion is formed on the groove portion side more than an intermediate portion between the groove portion and the bottom portion in the outer cylinder portion.

In the damper according to the present invention comprising the housing member wherein the bottom portion is formed at one end of the outer cylinder portion formed in the cylinder shape, the open end portion is formed at the other end of the outer cylinder portion, and the groove portion is formed on the inner periphery; and the lid member wherein a rotor or a piston inserted from the open end portion, and housed in the housing member is provided, and the projection portion engaging the groove portion is formed, the thin wall portion which is thinner than the outer cylinder portion may be formed on the groove portion side more than the intermediate portion which is between the groove portion and the bottom portion in the outer cylinder portion.

In the damper according to the present invention comprising the housing member wherein the bottom portion is formed at one end of the outer cylinder portion formed in the cylinder shape, the open end portion is formed at the other end of the outer cylinder portion, and the groove portion is formed on the inner periphery; the lid member wherein the rotor inserted from the open end portion, and housed in the housing member is provided, and the projection portion engaging the groove portion is formed; and a through path passing through the housing member and the lid member, the thin wall portion which is thinner than the outer cylinder portion may be formed on the groove portion side more than the intermediate portion between the groove portion and the bottom portion in the outer cylinder portion.

In the damper according to the present invention, preferably, the groove portion and the projection portion are annularly formed, and the thin wall portion is annularly formed along the groove portion.

Also, in order to obtain the aforementioned object, a method for manufacturing the damper according to the present invention includes a process of molding the housing member wherein the bottom portion is formed at one end of the outer cylinder portion formed in the cylinder shape, the open end portion is formed at the other end of the outer cylinder portion, and the groove portion is formed on the inner periphery; and a process of molding the lid member wherein the movable member housed in the housing member is provided, and the projection portion engaging the groove portion is formed so as to manufacture the damper by integrating the housing member and the lid member. Also, on the groove portion side more than the intermediate portion between the groove portion and the bottom portion in the outer cylinder portion, there is included a process of molding the thin wall portion which is thinner than the outer cylinder portion.

In the method for manufacturing the damper according to the present invention, preferably, when the open end portion is demolded from a die of an inside of the outer cylinder portion, the outer cylinder portion is elastically deformed by the thin wall portion.

Effects of the Invention

The damper and the method for manufacturing the damper according to the present invention have the aforementioned structure. By the structure, when the damper is demolded from a molding die in molding of the damper, the open end portion of the housing member is pressed open by a projecting portion of the molding die for forming the groove portion in the housing member, and the open end portion is elastically deformed toward an outside as a base point of the thin wall portion, and the open end portion temporarily enlarges a diameter. After the housing member is demolded from the molding die, the housing member is restored. Thereby, curling does not occur, and the open end portion becomes flat, so that the housing member and the lid member fit to each other precisely as measuring. Therefore, a shearing torque can be stabilized, which is determined by an interval with the movable member disposed mainly in an inside of the housing member through silicone oil.

BRIEF DESCRIPTION OF THE DRAWINGS

FIG. 1(a) and FIG. 1(b) show a damper according to one embodiment of the present invention, wherein FIG. 1(a) is a plan perspective view from above; and FIG. 1(b) is a bottom perspective view from below.

FIG. 3(a) and FIG. 3(b) show a housing member of the damper according to the embodiment of the present invention, wherein FIG. 3(a) is a plan perspective view from above; and FIG. 3(b) is a bottom perspective view from below.

FIG. 4(a) to FIG. 4(d) show the housing member of the damper according to the embodiment of the present invention, wherein FIG. 4(a) is a plan view; FIG. 4(b) is a side partial cross-sectional view; FIG. 4(c) is a front cross-sectional view taken along a line A-A in FIG. 4(a); and FIG. 4(d) is an enlarged view of an essential portion B in FIG. 4(c).

FIG. 5(a) and FIG. 5(b) show a lid member of the damper according to the embodiment of the present invention, wherein FIG. 5(a) is a plan perspective view from above; and FIG. 5(b) is a bottom perspective view from below.

FIG. 6(a) to FIG. 6(d) show the lid member of the damper according to the embodiment of the present invention, wherein FIG. 6(a) is a plan view; FIG. 6(b) is a side partial cross-sectional view; FIG. 6(c) is a front cross-sectional view taken along a line C-C in FIG. 6(a); and FIG. 6(d) is an enlarged view of a portion D in FIG. 6(c).

BEST MODES OF CARRYING OUT THE INVENTION

Figure 1A:
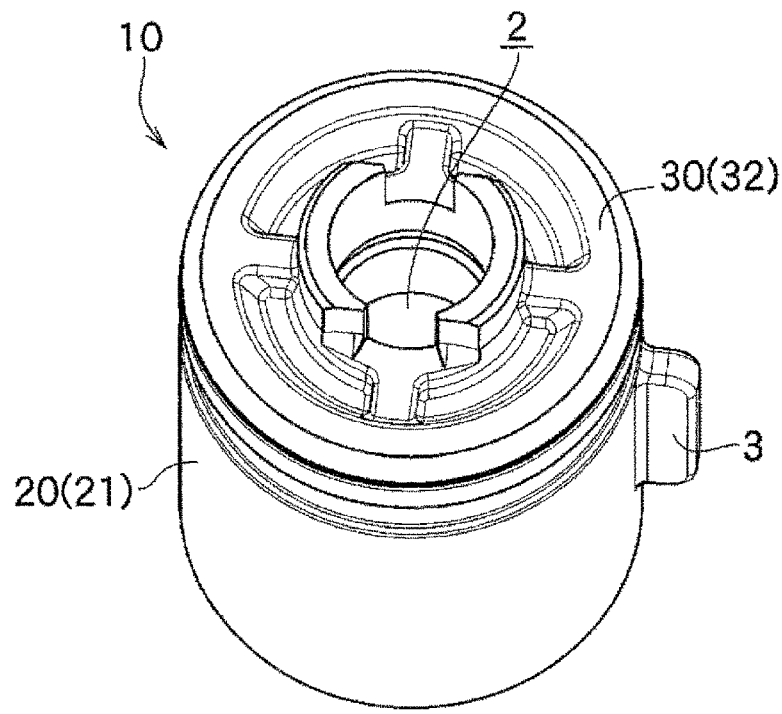
Figure 1B:
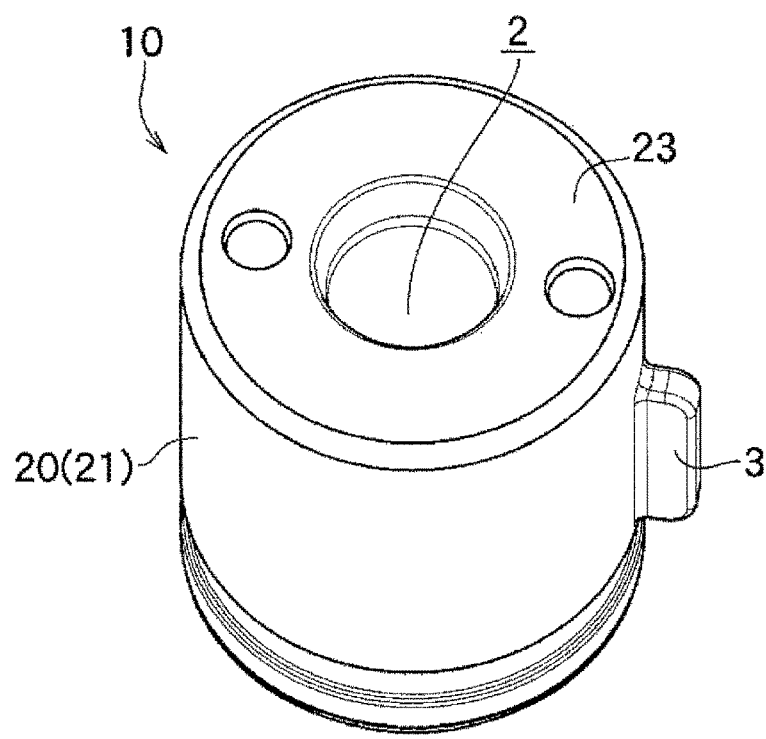
Figure 2:
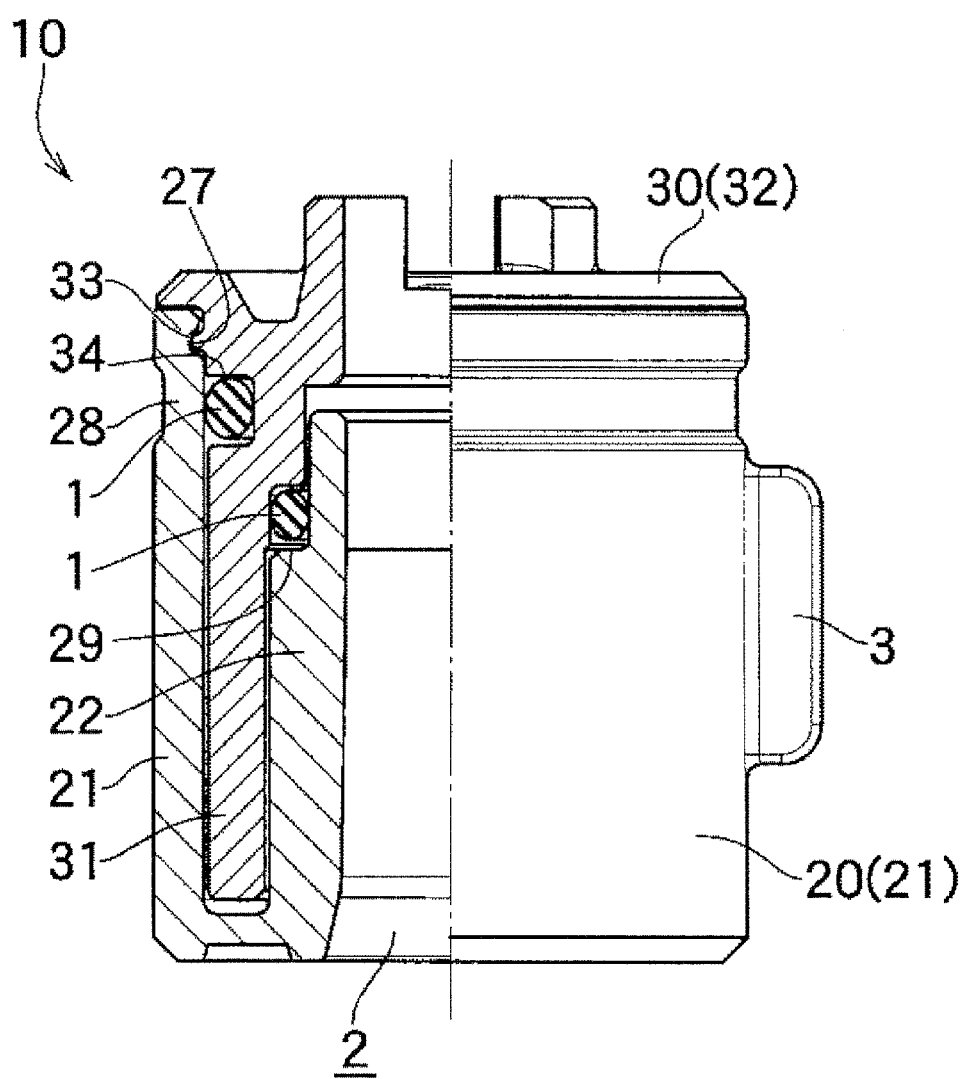
FIG. 2 is a partial cross-sectional side view from a side face of the damper according to the embodiment of the present invention.
Figure 3A:
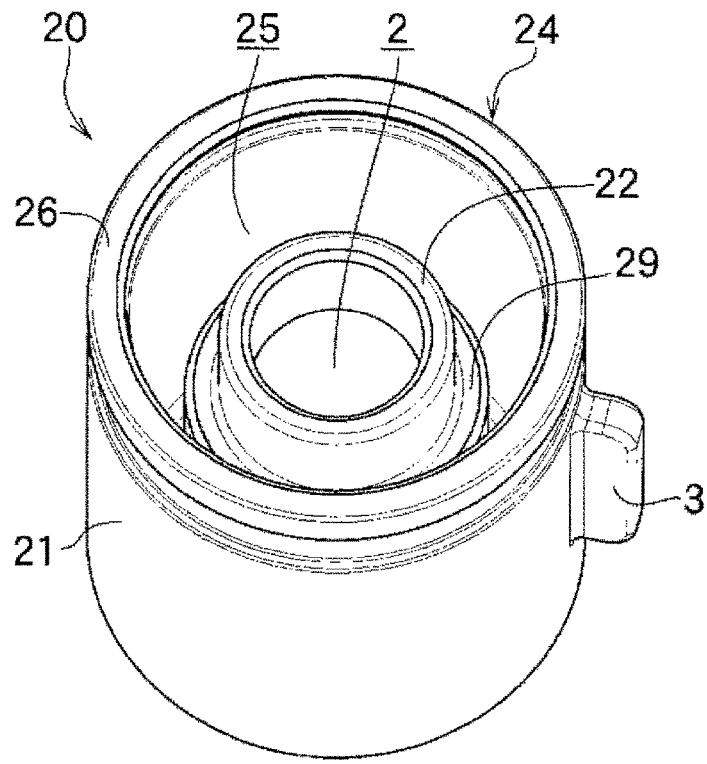
Figure 3B:
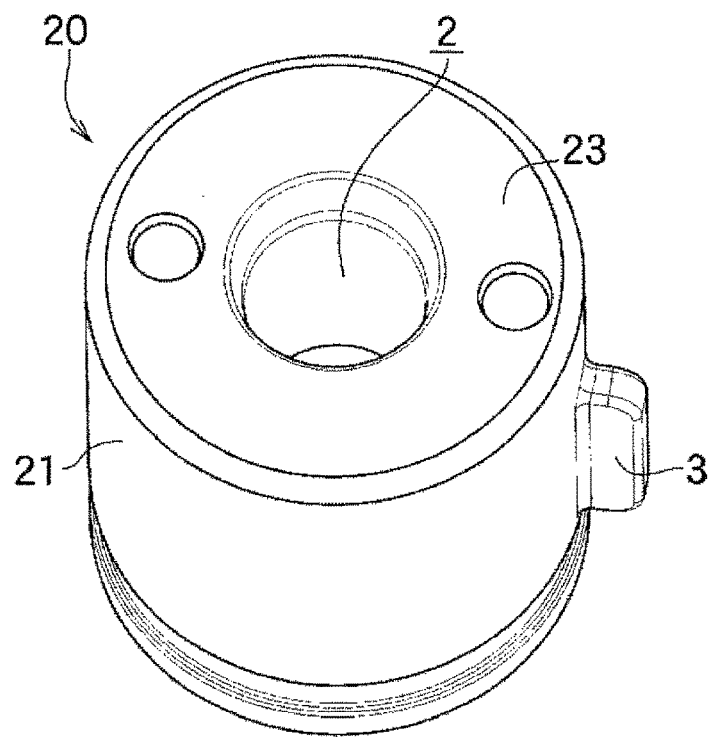

Hereinafter, a damper according to an embodiment of the present invention will be explained based on the drawings. FIG. 1(a) to FIG. 2 show a damper 10 according to the embodiment of the present invention; FIG. 3(a) to FIG. 4(d) show a housing member 20 of the damper 10 according to the embodiment of the present invention; and FIG. 5(a) to FIG. 6(d) show a lid member 30 of the damper 10 according to the embodiment of the present invention. Incidentally, in an explanation hereinafter, an upper side and a lower side are represented based on FIG. 2 as a standard, and an outside and an inside are represented based on an outer cylinder portion 21 as the standard.

<Damper>

As shown in FIG. 1(a) to FIG. 2, the damper 10 according to the present embodiment has a column shape wherein a center is penetrated and a through path 2 is formed, and is formed by fitting the housing member 20 (see FIG. 3(a) to FIG. 4(d)) to the lid member 30 (see FIG. 5(a) to FIG. 6(d)).

<Housing Member>

As shown in FIG. 3(a) to FIG. 4(d), in the housing member 20, there are concentrically disposed an outer cylinder portion 21 formed in a cylinder shape, and an inner cylinder portion 22 formed in a cylinder shape having a diameter smaller than that of the outer cylinder portion 21. In the housing member 20, a bottom portion 23 is formed at the lower side which is one end, and an open end portion 24 is formed at the upper side which is the other end. Namely, a lower end of the outer cylinder portion 21 and a lower end of the inner cylinder portion 22 are connected by the annularly formed bottom portion 23, and an upper end of the outer cylinder portion 21 and an upper end of the inner cylinder portion 22 are open to form the open end portion 24. A space between the outer cylinder portion 21 and the inner cylinder portion 22 is a housing area 25, and the lower end is closed by the bottom portion 23, and the upper end is open by the open end portion 24.

Figure 4A:
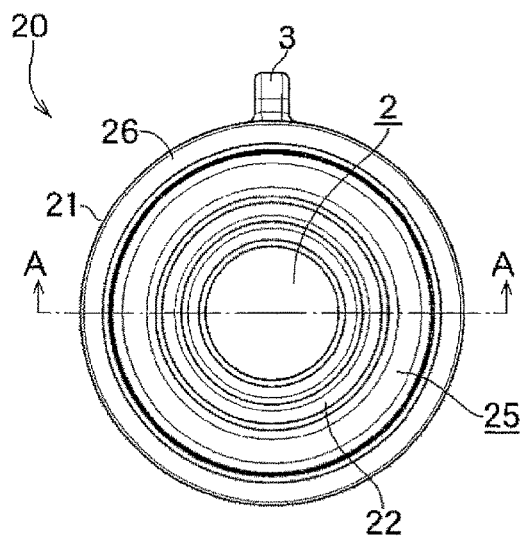
Figure 4B:
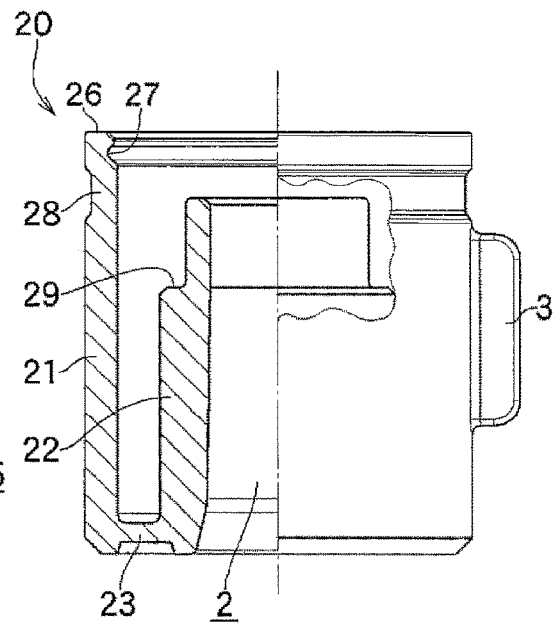
Figure 4C:
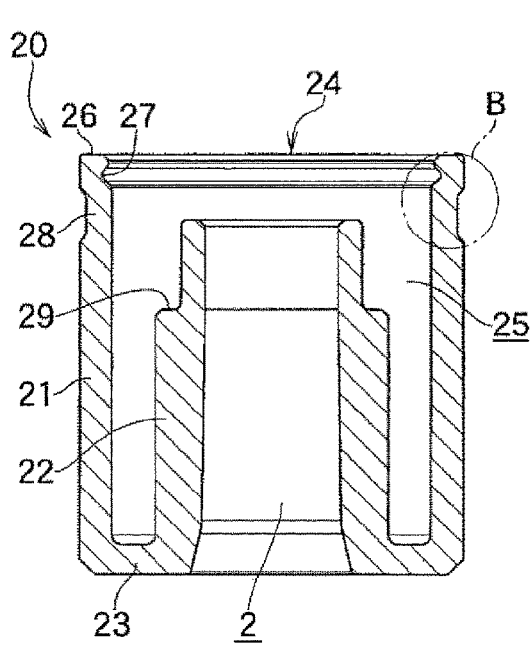
Figure 4D:
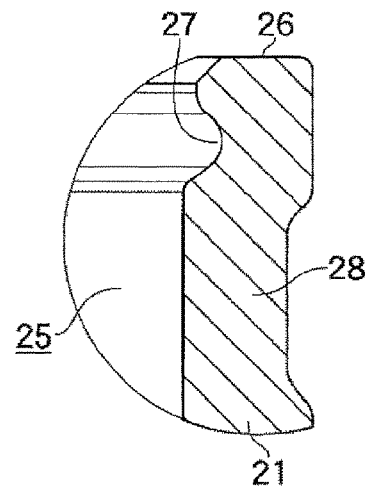
Figure 5A:
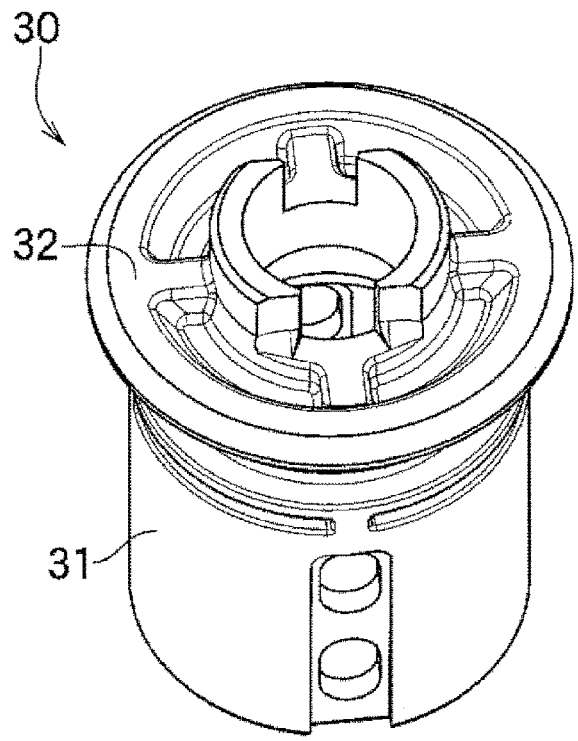
Figure 5B:
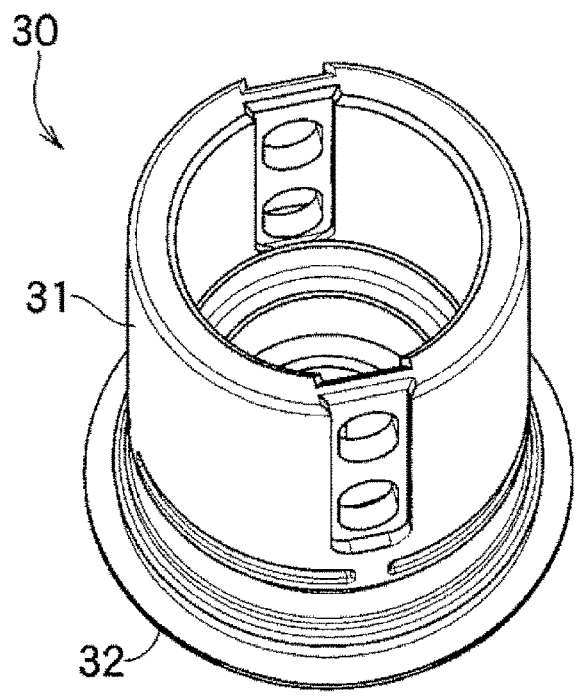
Figure 6A:
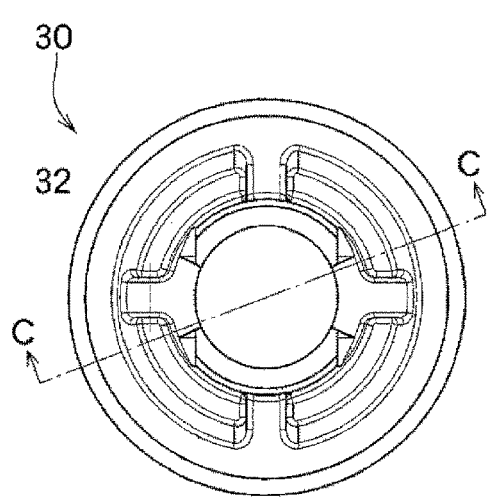
Figure 6B:
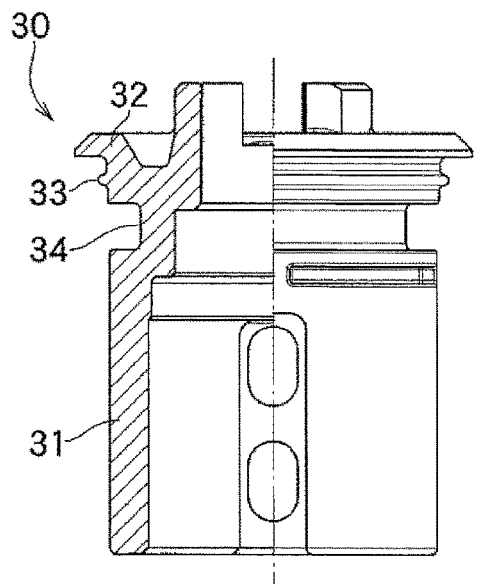
Figure 6C:
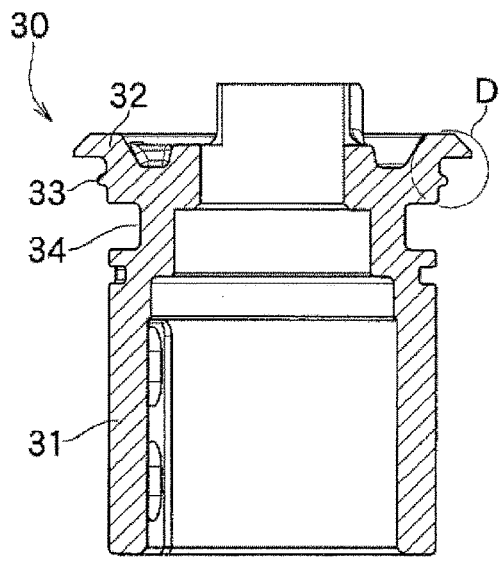
Figure 6D:
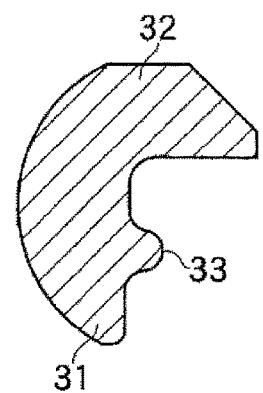

As shown in FIG. 4(b) and FIG. 4(c), in the outer cylinder portion 21, an outer cylinder upper end portion 26 which is the upper end of the open end portion 24 is flatly formed, and a groove portion 27 is formed on an inner peripheral face on an open end portion 24 side. The groove portion 27 annularly continues along an inner periphery. Also, in the outer cylinder portion 21, a thin wall portion 28 which is thinner than the outer cylinder portion 21 is formed on a groove portion 27 side more than an intermediate portion which is between the groove portion 27 and the bottom portion 23, and on an outer peripheral face in a vicinity of the groove portion 27. The thin wall portion 28 is formed by recessing the outer peripheral face of the outer cylinder portion 21, and continues annularly along an outer periphery.

In the inner cylinder portion 22, there is formed an inner cylinder step portion 29 which is thinner than the inner cylinder portion 22, and is recessed in a stepwise manner on the open end portion 24 side. The inner cylinder step portion 29 continues annularly along the outer periphery.

<Lid Member>

As shown in FIG. 5(a) to FIG. 6(d), the lid member 30 is formed by a rotor 31 as a movable member formed in a cylindrical shape, and a lid main member portion 32 wherein the rotor 31 is provided.

The rotor 31 is formed in a size which can be housed in the housing area 25 of the housing member 20, and is housed in the housing area 25. On the upper side of the rotor 31, there is connected the lid main member portion 32. The lid main member portion 32 is formed in a disk shape, and there is formed a projection portion 33 engaging the groove portion 27 of the housing member 20 (outer cylinder portion 21) (see FIG. 6(*b*) and FIG. 6(*c*)). The projection portion 33 continues annularly along the outer periphery. A lid step portion 34 is formed by recessing along the outer periphery between the lid main member portion 32 and the rotor 31. The lid step portion 34 continues annularly along the outer periphery.

In a case wherein the lid member 30 and the housing member 20 are integrated to form the damper 10, first, O-rings 1 are attached to the inner cylinder step portion 29 of the housing member 20 and the lid step portion 34 of the lid member 30 (see FIG. 2), and silicone oil (not shown in the drawings) is appropriately filled in the housing area 25 of the housing member 20. Next, the rotor 31 of the lid member is inserted into the housing area 25 of the housing member 20. A lower end of the rotor 31 of the lid member 30 reaches the bottom portion 23 in the housing area 25 of the housing member 20 to fit the projection portion 33 of the lid member 30 (lid main member portion 32) and the groove portion 27 of the housing member 20 (outer cylinder portion 21). Since the outer cylinder upper end portion 26 is formed flatly, the open end portion 24 of the housing member 20 conforms to the lid member 30 (lid main member portion 32) so as to come to an appropriate fitting state. Thereby, the damper 10 wherein the housing member 20 and the rotor 30 relatively rotate coaxially, is formed.

Incidentally, in a case wherein, for example, the damper is a cylinder-type damper (not shown in the drawings), the inner cylinder portion is not formed in the housing member. Namely, the damper is formed by the housing member wherein the bottom portion is formed at one end of the outer cylinder portion formed in the cylinder shape, the open end portion is formed at the other end of the outer cylinder portion, and the groove portion is formed on the inner periphery; and the lid member wherein a cylinder as the movable member housed in the housing member is provided, and the projection portion engaging the groove portion is formed.

Next, a forming die (not shown in the drawings) for forming the housing member 20 of the damper 10 according to the embodiment of the present invention will be explained. Incidentally, a forming die and a molding method of the lid member are the same as conventional ways, so that an explanation thereof is omitted.

The forming die for forming the housing member 20 is formed by, for example, in FIG. 4(*c*), a fixed side plate disposed on a bottom portion 23 side; a fixed side core pin passing through the bottom portion 23, and disposed on the inside (through path 2) of the inner cylinder portion 22; a slider disposed on an outer periphery of the outer cylinder portion 21 and the open end portion 24; a movable side core pin disposed in the housing area 25 through the open end portion 24; and a stripper plate disposed on the open end portion 24 side, contacting the outer cylinder upper end portion 26 after the slider slides from the outside of the outer cylinder portion 21 and the open end portion 24, and pushing out in a mold releasing direction in such a way as to strip off the housing member 20 attached to the movable side core pin.

In the fixed side plate, there is formed a disk-shaped recess for forming the bottom portion 23, and at a center of the recess, there is provided the fixed side core pin. The fixed side core pin is movable in an up-and-down direction relative to the fixed side plate through the center of the disk-shaped recess formed in the fixed side plate, and forms the through path 2 of the outer cylinder portion 21. The slider is formed by two members, and the two members are integrated so as to form a columnar space for forming an external shape of the outer cylinder portion 21. In the slider, an annular convexity portion for forming the thin wall portion 28 is formed on the inner periphery. The movable side core pin is formed in a column shape, and the annular convexity portion for molding the groove portion 27 is formed on an outer periphery, and a receiving hole into which the fixed side core pin is inserted is formed in an axial direction. The movable side core pin is disposed in the columnar space formed by the slider, so that the outer cylinder portion 21 is formed between the slider and the movable side core pin, the inner cylinder portion 22 is formed between the movable side core pin and the fixed side core pin, and together with those, the housing area 25 is formed.

Next, a molding method for molding the housing member 20 of the damper 10 according to the embodiment of the present invention will be explained.

Each forming die is disposed at a predetermined position, and in a state wherein a cavity having the same shape as the housing member 20 is formed, a predetermined material such as a molten resin or the like is injected into the cavity. When the molten resin is cooled and hardened, before the resin is completely hardened, the die is open to mold the housing member 20.

Specifically, when the die is open, first, the fixed side core pin is pulled out to the lower side, and next, the slider is detached and open to the outside. At that time, the outer peripheral face is recessed along the outer periphery of the outer cylinder portion 21 by the convexity portion formed in the slider, and in the outer cylinder portion 21, the thin wall portion 28 which is thinner than the outer cylinder portion 21 is molded on the outer peripheral face in the vicinity of the groove portion 27 on the groove portion 27 side more than the intermediate portion which is between the groove portion 27 and the bottom portion 23.

Next, the stripper plate is applied to the outer cylinder upper end portion 26 of the housing member 20 (outer cylinder portion 21), and further, the stripper plate pushes out the housing member 20 attached to the movable side core pin in such a way as to strip off so as to be demolded. When the groove portion 27 of the outer cylinder portion 21 is demolded from the convexity portion of the movable side core pin, the open end portion 24 side of the outer cylinder portion 21 is pressed open by the convexity portion, and the open end portion 24 elastically deforms toward the outside as a base point of the thin wall portion 28, and the open end portion 24 temporarily enlarges a diameter. After the convexity portion of the movable side core pin passes through the open end portion 24, and the housing member 20 is demolded, the outer cylinder portion 21 is restored.

The housing member 20 molded as described above, and the lid member 30 are concentrically integrated, and the damper 10 shown in FIG. 1(*a*) to FIG. 2 is manufactured.

Incidentally, a position of the thin wall portion 28 is arbitrary between the groove portion 27 and the bottom portion 23 provided that the following operation can be provided, wherein when the convexity portion of the movable side core pin is pulled out of the groove portion 27 of the outer cylinder portion 20, the open end portion 24 side of the outer cylinder portion 21 is pressed open by the convexity portion, the open end portion 24 elastically deforms toward the outside as the base point of the thin wall portion 28, and after the convexity portion passes through the open end portion 24, and is pulled out of the housing member 20, the outer cylinder portion 21 is restored. However, it is necessary for avoiding a position of a rib 3 of the outer cylinder portion 21.

Next, effects of the damper 10 according to the embodiment of the present invention will be explained.

As described above, with respect to the damper 10 according to the present embodiment, in the outer cylinder portion 21, the thin wall portion 28 which is thinner than the outer cylinder portion 21 is formed on the outer peripheral face in the vicinity of the groove portion 27 on the groove portion 27 side more than the intermediate portion which is between the groove portion 27 and the bottom portion 23. According to the structure, in molding the housing portion 20, when the convexity portion of the movable side core pin is demolded from the groove portion 27 of the outer cylinder portion 21, the open end portion 24 side of the outer cylinder portion 21 is pressed open by the convexity portion, the open end portion 24 elastically deforms toward the outside as the base point of the thin wall portion 28, and the open end portion 24 temporarily enlarges a diameter. After the convexity portion of the movable side core pin passes through the open end portion 24, and is demolded from the housing member 20, the outer cylinder portion 21 is restored. Thereby, curling does not occur, and the open end portion 24 becomes flat, so that the housing member 20 and the lid member 30 fit to each other to precise measure. Therefore, a shearing torque can be stabilized, which is determined by an interval with the rotor 31 disposed mainly in a gap (housing area 25) between an inner face of the outer cylinder portion 21 and an outer face of the inner cylinder portion 22 through the silicone oil.

With respect to the damper 10 according to the present embodiment, when the molten resin is cooled and hardened, before the resin is completely hardened, the die is opened, and the housing member 20 is molded. Namely, before being hardened, the housing member 20 is demolded from the movable side core pin, so that the outer cylinder portion 21 is easily elastically deformed as the base point of the thin wall portion 28. Therefore, precision of a molded article can be improved, and a cost can be suppressed by reducing a molding time.

The embodiment of the present invention has been described above in detail, and the present invention is not limited to the embodiment described hereinabove, and can be variously modified provided that they do not exceed the subject of the present invention.

EXPLANATION OF SYMBOLS

1 O-rings
2 a through path
3 a rib
10 a damper
20 a housing member
21 an outer cylinder portion
22 an inner cylinder portion
23 a bottom portion
24 an open end portion
25 a housing area
26 an outer cylinder upper end portion
27 a groove portion
28 a thin wall portion
29 an inner cylinder step portion
30 a lid member
31 a rotor (movable member)
32 a lid main member portion
33 a projection portion
34 a lid step portion Incidentally, all contents of the specification, claims, drawings, and abstract of Japanese Patent Applications No. 2015-031605 filed on Feb. 20, 2015 are cited in their entireties herein and are incorporated as a disclosure of the specification of the present invention.

What is claimed is:

1. A damper, comprising:
a housing member including
an outer cylinder portion formed in a cylinder shape,
an inner cylinder portion formed inside the outer cylinder portion,
a bottom portion connecting bottoms of the outer and inner cylinder portions,
an open end portion formed at an upper end of the outer cylinder portion,
a groove portion formed on an inner periphery of the outer cylinder portion adjacent the open end portion, and
a thin wall portion of the outer cylinder portion which is thinner than a remaining portion of the outer cylinder portion, formed in a vicinity of the groove portion so that an outer surface of the outer cylinder portion is recessed inwardly between an upper outer surface and a lower outer surface forming the outer cylinder portion;
a lid member having
a movable member housed in the housing member between the inner and outer cylinder portions and including a lid step portion formed at an upper end portion of the movable member and annularly recessed from an outer surface of the movable member, and
a lid main member portion connected to the upper end portion of the movable member to cover the open end portion, and including a projection portion projecting annularly outwardly from the lid main member portion above the lid step portion and engaging the groove portion; and
an O-ring housed in the lid step portion and contacting an inner surface of the thin wall portion to seal between the housing member and the lid member,
wherein the outer surface of the outer cylinder portion is a flat surface in section cut in an axial direction of the housing member at the thin wall portion, and an inner surface of the outer cylinder portion is a flat surface in section cut in the axial direction of the housing member between the bottom portion and the groove portion.

2. A damper according to claim 1, wherein the movable member is a rotor or a piston inserted from the open end portion and housed in the housing member.

3. A damper according to claim 1, wherein the movable member is a rotor inserted from the open end portion and housed in the housing member, and having a through path passing through the housing member and the lid member.

4. A damper according to claim 1, wherein the groove portion and the projection portion are annularly formed, and along the groove portion, the thin wall portion is annularly formed.

5. A method for manufacturing a damper, comprising:
a process of molding a housing member including an outer cylinder portion in a cylinder shape, an inner cylinder portion inside the outer cylinder portion, a bottom portion connecting bottoms of the outer and inner cylinder portions, an open end portion at an upper end of the outer cylinder portion, a groove portion on an inner periphery of the outer cylinder portion adjacent the open end portion, and a thin wall portion of the outer cylinder portion which is thinner than a remaining portion of the outer cylinder portion, located in a vicinity of the groove portion so that an outer surface of the outer cylinder portion is recessed inwardly between an upper outer surface and a lower outer surface forming the outer cylinder portion;

a process of molding a lid member having a movable member to be housed in the housing member between the inner and outer cylinder portions, the movable member including a lid step portion formed at an upper end portion of the movable member and annularly recessed from an outer surface of the movable member, and a lid main member portion connected to an upper end portion of the movable member to cover the open end portion, the lid main member portion including a projection portion projecting annularly outwardly from the lid main member above the lid step portion and engaging the groove portion; and a process of housing an O-ring in the lid step portion and integrating the housing member and the lid member by contacting the O-ring and an inner surface of the thin wall portion to seal between the housing member and the lid member, to form a damper, wherein the outer surface of the outer cylinder portion is a flat surface in section cut in an axial direction of the housing member at the thin wall portion, and an inner surface of the outer cylinder portion is a flat surface in section cut in the axial direction of the housing member between the bottom portion and the groove portion.

6. A method for manufacturing a damper according to claim 5, wherein when the open end portion is demolded from a die on an inside of the outer cylinder portion, the outer cylinder portion is elastically deformed at the thin wall portion.

7. A damper according to claim 1, wherein the thin wall portion is recessed between the upper outer surface and the lower outer surface of the outer cylinder portion, and the groove portion is located laterally inside the upper outer surface.

8. A damper according to claim 7, wherein the lid step portion is located under the projection portion and laterally inside the thin wall portion.

9. A damper according to claim 1, wherein the lid main member portion includes an upper portion annularly outwardly projecting to be formed in a disk shape and arranged on a top surface of the outer cylinder portion, and the projection portion projects from the lid main member portion between the upper portion and the lid step portion, and the top surface of the outer cylinder portion and a lower surface of the upper portion are flats surfaces, respectively, to appropriately fit each other.

* * * * *